United States Patent [19]
Harmening

[11] 3,964,336
[45] June 22, 1976

[54] STEERABLE MOUNT

[75] Inventor: Wayne Arthur Harmening, Cherry Hill, N.J.

[73] Assignee: RCA Corporation, New York, N.Y.

[22] Filed: Sept. 3, 1974

[21] Appl. No.: 502,673

[52] U.S. Cl. .................. 74/501 M; 74/471 XY; 248/487; 350/285; 350/288
[51] Int. Cl.² ........................................ G03B 17/26
[58] Field of Search .............. 74/501 M, 471 XY; 350/285, 7, 310, 255, 288; 248/487

[56] References Cited
UNITED STATES PATENTS

| | | | |
|---|---|---|---|
| 2,724,995 | 11/1955 | Matner | 350/7 |
| 3,555,450 | 1/1971 | Rockwell, Jr. | 350/310 X |
| 3,628,175 | 12/1971 | Rigden | 350/285 X |
| 3,751,139 | 8/1973 | Malherbe | 350/288 X |

*Primary Examiner*—William F. O'Dea
*Assistant Examiner*—Harold Joyce
*Attorney, Agent, or Firm*—Edward J. Norton; William Squire

[57] ABSTRACT

A mount suspension system comprising a housing, a flexible planar diaphragm and a flexible strut is arranged to respond to a force to provide substantially frictionless angular steering for the mount about desired axes in the plane of the diaphragm while restraining substantially all other angular mount displacements as well as restraining substantially all linear displacement.

6 Claims, 4 Drawing Figures

3,964,336

STEERABLE MOUNT

BACKGROUND OF THE INVENTION

1. Field of the Invention

This invention relates to an angularly steerable mount and more particularly to a steerable mount supported by a flexible diaphragm and strut.

2. Description of the Prior Art

A system having a mass such as a mirror joined to a steerable mount comprising an arrangement of gears and ball joints are well known in the art. A problem frequently encountered with such prior art steerable mounts is undesired friction and backlash resulting from motion of the mount gears and ball joints. The undesired friction and backlash result in errors in the desired angular displacement of the mirror and mount. Thus, it is desired to arrange a mount suspension system which will provide substantially frictionless and backlash free steering for a mass or device joined to the mount.

SUMMARY OF THE INVENTION

In accordance with the present invention, a mount suspension system comprises a housing, a flexible planar diaphragm and a flexible strut. The diaphragm is arranged to support the mount by joining the diaphragm to the mount and to the housing. The strut is arranged to support the mount by joining one end to the housing and an opposite strut end to the mount. A lever having one end joined to the mount is arranged to be responsive to a force applied to a lever end opposite the one end and parallel to the diaphragm for establishing a torque about an axis in the plane of the diaphragm. The torque induces an angular displacement of the mount about the desired axis.

DESCRIPTION OF THE PREFERRED EMBODIMENT

Figure 1:
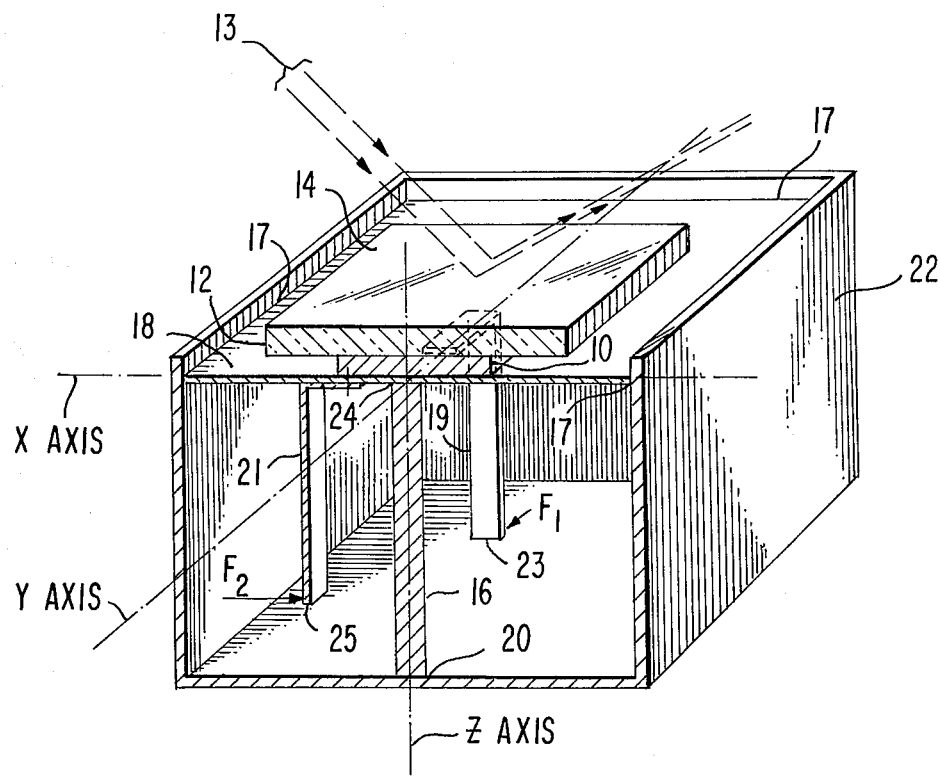
FIG. 1 is a perspective drawing, in section, of a substantially frictionless steerable mount according to the invention.

Referring to FIG. 1, there is shown a perspective drawing, in section, of a substantially frictionless steerable mount 10 for a mass or device such as a mirror or radar reflector. For purposes of description and not limitation, the mass is illustrated as a mirror 12 having a surface 14 for reflecting light waves 13 incident thereon. It is desired that mirror surface 14 be angularly steerable about one or more predetermined axes so as to reflect an incident light beam at a desired angle relative to the angle of incidence.

One end of flexible column or strut 16 and flexible diaphragm 18 are suitably attached or joined to rigid structure or housing 22 for supporting mount 10 and provides substantially frictionless angular steering for mount 10 in response to a moment or torque applied about either an $x$ or $y$-axis of diaphragm 18. The diaphragm $x$ and $y$-axes are mutually orthogonal and are in the plane of diaphragm 18. The other end 24 of column 16 is suitably joined or attached to diaphragm 18 and mount 10 such that there is a substantially rigid connection of the column 16 to both the diaphragm 18 and the mount 10. The longitudinal $z$-axis of column 16 is substantially normal to the diaphragm $x$-$y$ plane.

Lever or moment arms 19 and 21 are suitably joined to diaphragm 18 and mount 10 such that they are substantially normal respectively to diaphragm 18. Lever arms 19 and 20 are examples of means for applying a torque to diaphragm 18 and consequently mount 10 about either the diaphragm $x$ or $y$-axis in response to a force from a source, not shown, applied to lever arms 19 and 21 in a direction substantially parallel to the plane of diaphragm 18. For example, a force, $F_1$, in a direction substantially parallel to the mount $y$-axis, is coupled normal to end 23 of lever arm 19 for establishing a torque or moment about the diaphragm $x$-axis. A force, $F_2$, in a direction substantially parallel to the mount $x$-axis, is coupled normal to end 25 of lever arm 21 for establishing a torque about the diaphragm $y$-axis. A torque about the diaphragm $x$ or $y$-axis causes or tends to cause an angular mount displacement relative to the plane of diaphragm 18. It should be noted that forces applied simultaneously about the $x$ and $y$ axes will cause a resultant torque about an axes related to the $x$ and $y$ axes as well understood in this art. Thus, column 16 and diaphragm 18 are arranged as a mount 10 suspension system permitting angular movement of mount 10 in response to a torque applied about either the mount 10 $x$ or $y$-axis or other related axes depending on the axis about which the torque is applied.

Figure 2:
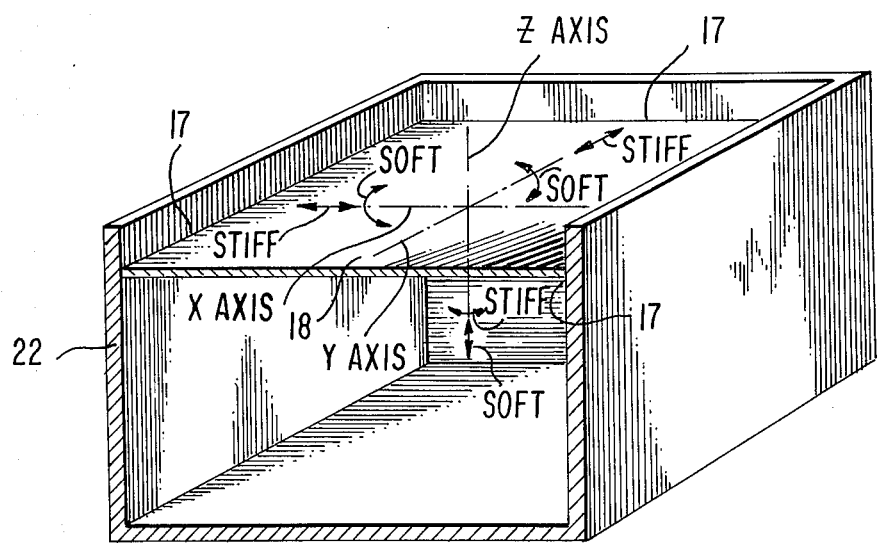
FIG. 2 is a perspective drawing, in section, of a diaphragm and housing arranged according to the invention and a vector diagram illustrating various possible diaphragm displacements in response to a force or torque applied to the diaphragm.

Referring to FIG. 2, there is shown a perspective drawing, partially in section, of diaphragm 18 and a vector diagram illustrating possible displacements or directions of diaphragm motion in response to a force or torque applied to diaphragm 18 when diaphragm edges 17 are attached to rigid structure or housing 22. The use of the word "stiff" in FIG. 2 denotes a restraint of motion or displacement of diaphragm 18 while the word "soft" denotes displacement or motion of diaphragm 18 in the direction indicated by the vectors. Diaphragm 18 is formed from flexible material, such as thin gauge steel, and is joined by suitable means such as welding or an adhesive to housing 22. The joining of diaphragm 18 to housing 22 restrains linear motion or displacement in the plane of diaphragm 18 in response to a force directed in the plane of the diaphragm. The arrangement of diaphragm 18 and housing 22 also restrains rotational or angular motion of diaphragm 18 in the diaphragm plane about an axis normal to the diaphragm plane. Thus, diaphragm 18 displacement due to a moment or torque applied to diaphragm 18 about the diaphragm $z$-axis is restrained, where the $z$-axis is normal to the diaphragm plane. However, a moment or torque applied to diaphragm 18 about any suitable axis in the plane of the diaphragm produces desired angular motion or diaphragm displacement about such axis.

It will be apparent to those skilled in this art that a force directed along the diaphragm $z$-axis will, in general, linearly displace diaphragm 18 in the direction of the applied force. However, such a displacement along the $z$-axis is undesirable in accordance with the present invention. The undesirable z axis displacement of diaphragm 18 as occurs in the arrangement shown in FIG. 2 is restrained by attaching one end 24 of flexible column or strut 16, formed from material such as a steel rod, to substantially the center of diaphragm 18 and mount 10, and the other end 20 of column 16 to housing 22, as shown in FIG. 1. The longitudinal axis of column 16 is arranged to be substantially parallel and coincident with the z axis of diaphragm 18. Column 16 is suitably flexible to permit the desired angular motion of mount 10 in response to a moment or torque applied to an axis in the plane of diaphragm 18. Thus, it is to be understood that the mount 10 suspension system, comprising diaphragm 18, column 16 and housing 22 as shown in FIG. 1, is thereby arranged to provide desired angular movement of mount 10 in response to a moment or torque applied about an axis in the plane of diaphragm 18 while restraining substantially all other linear or angular mount 10 movements or displacements.

Figure 3:
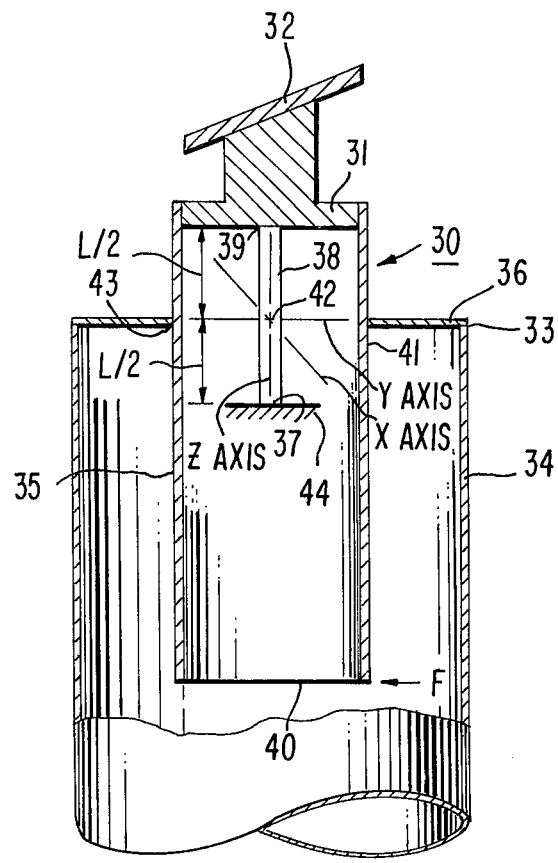
FIG. 3 is a cross section drawing of a substantially frictionless steerable mount according to another embodiment of the invention.

Referring to FIG. 3, there is shown in cross section a substantially frictionless steerable mount 30 for supporting a mirror 32, the mount 30 being in the form of a hollow cylinder 35 having an end plate 31 supporting the mirror 32 according to another embodiment of the invention. The suspension system for mount 30 comprises flexible diaphragm 36, a flexible column or strut 38 positioned within cylinder 35 and a rigid structure or housing 34. The mount 30 suspension system is arranged to restrain linear displacements of mount 30 while providing a desired angular displacement of mount 30 and mirror 32 in response to a force, F, from a source, not shown. The force, F, is applied substantially normal to mount end 40 and substantially parallel to the plane of diaphragm 36 so as to establish a torque about any axis in the plane of diaphragm 36 as will be described.

The edges 33 of diaphragm 36 and one end 37 of strut 38 are suitably joined to rigid structure 44 or housing by bonding or welding. Diaphragm 36 is in the form of a circular shaped thin gauge metal disc. The other end 39 of strut 38 is joined to the center of end plate 31 so as to be substantially coaxial with cylindrical mount 30. The outer wall 41 of mount 30 is suitably joined to diaphragm 36 as at 43 so that diaphragm 36 cooperates with strut 38 in supporting mount 30. An example of a method for joining diaphragm 36 to outer wall 41 of mount 30 includes forming diaphragm 36 with a centrally located hole with a diameter substantially equal to the outside diameter of mount 30. Diaphragm 36 is then placed over and welded or bonded to outside wall 41 of mount 30 at 43.

Suspension system elements 36 and 38 are arranged to restrain undesired mount 30 motion in the manner described above for suspension system elements 16 and 18 shown in FIGS. 1 and 2. However, in FIG. 3, the plane of diaphragm 36 preferably bisects the length of strut 38 in order to minimize the magnitude of the force, F, necessary to angularly displace mount 30 about an axis in the plane of diaphragm 36. In addition to supporting mirror 32, the portion of mount 30 from diaphragm 36 to mount end 40 functions as a lever or moment arm for a force, F, coupled to mount end 40. Force, F, establishes a torque about either the diaphragm x or y-axis for angularly displacing mirror 32 about a center of rotation at the intersection 42 between the extension of the plane of diaphragm 36 and strut 38. For example, a torque about the diaphragm x-axis is established when the direction of force, F, is parallel to the diaphragm y-axis. A torque about the diaphragm y-axis is established when the direction of force F is parallel to the diaphragm x-axis. As previously indicated, various combinations of forces may be applied simultaneously whereby resultant torques about related axis will be developed. The magnitude of the torque is equal to the product of the length of the lever or moment arm times the magnitude of force F.

In summary, the suspension system for mount 30 includes flexible elements, such as diaphragm 36 and strut 38 arranged with housing 34 to provide a means for steering or directing mirror 32 with relatively little friction and lost motion or backlash. It will be appreciated by those skilled in the art that mechanical resonances for the suspension system of mount 30 are well defined. As known in the art, mechanical resonances determine a desirable crossover frequency for a servo control loop such as the suspension system described above. The term "crossover frequency" is used to mean that frequency at which the gain of the control loop is unity. A lack of backlash and friction in a servo control loop permits a significant increase in control loop gain at frequencies below the crossover frequency without undesired low frequency oscillation commonly encountered in servo control loop systems having backlash. Increased control loop gain at frequencies below the crossover frequency reduce errors in the desired angular displacement of mirror 32 as well as suspension system sensitivity to undesired disturbances caused by sources external to the suspension system.

It should be understood that the present invention is not limited to the particular form of the flexible diaphragm and strut described in the various figures. For example, a triangular or square shaped diaphragm formed from a suitable flexible material may be used in place of the circular or rectangular shaped thin gauge steel diaphragm described above.

Figure 4:
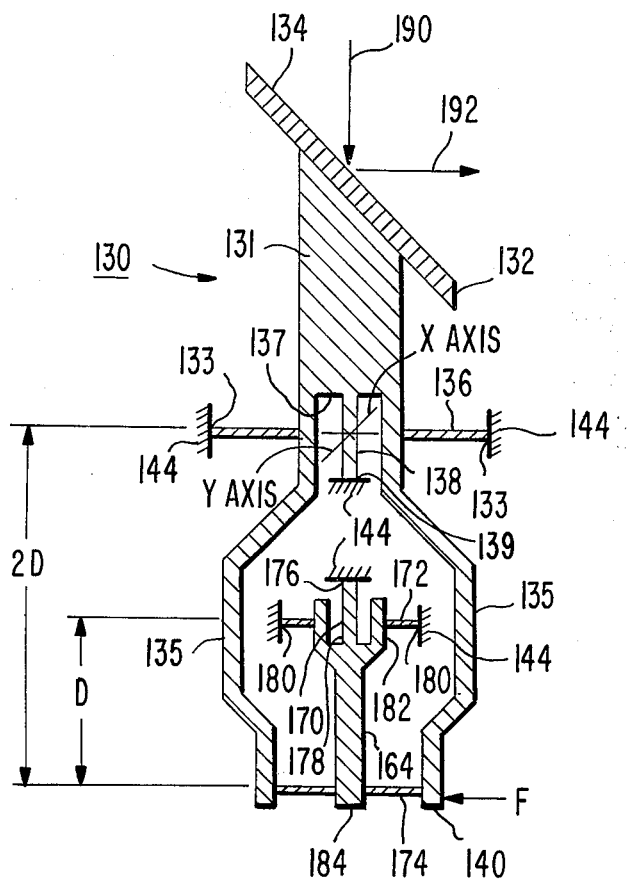
FIG. 4 is a cross sectional drawing of a substantially frictionless steerable mount according to a further embodiment of the invention.

Referring to FIG. 4, there is shown in cross section an angularly steerable mount 130 having a dual lever system arranged to behave as a substantially frictionless and backlash free gear train connected between mirror 132 and gyro lever 164. A rate sensing gyroscope, not shown, coupled to gyro lever 164 provides an indication of the inertial rate at which an incident beam of light 190 is reflected by mirror surface 134 as mount 130 is angularly steered about a predetermined axis. Mirror 132 is arranged to be angularly steerable about the transverse axis and to reflect an incident beam of light 190 with an optical gain of 2:1. Thus, one angular unit of motion of mirror lever 135 and mirror 132 about the transverse x-axis causes the reflected light beam 192 to be displaced two angular units. It will be appreciated by one skilled in this art that angular steering motions for mirror 132 about the transverse x-axis complicates inertial rate sensing when the optical gain of the reflected beam 192 is greater than unity. As will be discussed below, steerable mount 130 is arranged to compensate for a reflected beam 190 with an optical gain of 2:1 in order to facilitate inertial rate sensing by a rate sensing gyroscope, not shown, coupled to gyro lever 164.

The first lever system of mount 130 is similar in operation and arrangement, to the mount 30 suspension system discussed above in reference to FIG. 3. In this first lever system, mirror 132 is connected to mirror lever 135, which in turn is supported by flexible mirror lever strut 138 and flexible mirror lever diaphragm 136. One end 137 of mirror strut 138 is connected to mirror mount end 131 and mirror diaphragm 136 surrounds and is attached to the outer wall of mirror lever which is of the form of a hollow structure 135. The ends 133 of mirror lever diaphragm 136 and end 139 of mirror lever strut 138 are attached to a suitable rigid structural support 144. Thus, in the manner described for FIG. 3, a first lever system comprising mirror lever 135, mirror lever strut 138 and mirror lever diaphragm 136 is arranged to support mirror 132 and to provide angular steering of mirror 132 about a predetermined axis in response to a force, F, coupled to mirror lever end 140.

A second lever system of mount 130 is arranged to have a gyro lever 164 responding to angular movements of mirror lever 135 to provide an angular displacement of lever 164. The angular displacement of lever 164 is twice the angular displacement of mirror lever 135. Thus, the angular displacement of gyro lever 164 corresponds to the angular displacement of reflected light beam 192 when mirror 137 is steered about the transverse x-axis.

The second lever system of mount 130 is formed of gyro lever 164, flexible gyro lever strut 170, flexible gyro lever annular diaphragm 172 and flexible floating annular diaphragm 174. One end 176 of gyro lever strut 170 is suitably connected to support 144, and the other end 178 of strut 170 is suitably connected to lever 164. The peripheral edges 180 of diaphragm 172 are suitably attached to structure 144, and in addition, diaphragm 172 surrounds and is attached to the outside surface 182 of lever 164.

Floating annular diaphragm 174 surrounds and is attached near the end 184 of gyro lever strut 164. The peripheral edge of diaphragm 174 is attached near the end 140 of mirror lever 135. The distance, D, between the plane of floating diaphragm 174 and the plane of gyro lever diaphragm 172 is one half the distance, 2D, between the plane of floating diaphragm 174 and the plane of mirror lever diaphragm 136.

A force, F, applied to end 140 of mirror lever 135 as shown causes an angular displacement of mirror lever 135 as well as an angular displacement of gyro lever 164 since floating diaphragm 174 provides a mutual coupling or connection between mirror lever 135 and gyro lever 164. The magnitude of the angular displacement of gyro lever 164 is twice the magnitude of the angular displacement of mirror lever 135 since the distance, D, between the plane of floating diaphragm 174 and the plane of mirror lever diaphragm 136. A rate sensing gyroscope (not shown) suitably coupled to gyro lever 164 provides a means to sense the inertial rate of the reflected beam as effected by transverse axis beam steering. Thus the dual lever system as embodied in FIG. 4 provides a gear ratio of 2:1 without the friction or backlash inherent in a usual gear train.

The invention is particularly useful in laser systems providing means for steering light reflecting mirrors. However, it will be appreciated that the invention will be useful in other environments requiring small angular movements.

According to the teaching of this invention a steerable mount is suspended in a rigid structure or housing by one or more thin flexible diaphragms and struts. It will be appreciated that the system is substantially frictionless, the friction of which system being limited by the materials used, and not, as in the prior art, by the friction contact of cooperating parts.

What is claimed is:
1. A mount suspension system comprising:
 a housing;
 a mount;
 a flexible planar diaphragm joined to said mount and said housing for supporting said mount;
 a flexible strut having one end joined to said housing and an end opposite said one end joined to said mount for supporting said mount;
 a lever having one end joined to said mount, said lever being responsive to a force applied to the lever end opposite said one end for establishing a torque about an axis in the plane of said diaphragm for angularly displacing said mount about said axis.
2. A mount suspension system according to claim 1, wherein said diaphragm is a thin flexible metal disc.
3. A mount suspension system according to claim 1, wherein said strut is a flexible metal rod.
4. A mount suspension system according to claim 1, wherein said strut has its longitudinal axis normal to said diaphragm.
5. A mount suspension system according to claim 1, further including:
 a second flexible planar diaphragm having edges joined to said lever end opposite said one lever end,
 a second lever having one end joined to said second flexible planar diaphragm;
 a third flexible planar diaphragm joined to said second lever and said housing for supporting said second lever;
 a second flexible strut having one end joined to said housing and an end opposite said second strut one end joined to said second lever for supporting said second lever.
6. A mount suspension system comprising:
 a rigid structure;
 a mount;
 a thin planar flexible metal diaphragm joined to said mount, said diaphragm having edges joined to said structure for supporting said mount;
 a flexible metal strut having one end portion joined to said structure and diaphragm and an end opposite to said one end portion joined to said mount for supporting said mount;
 a lever having one end joined to said mount, said lever being responsive to a force having a component coupled normal to the lever end opposite said one end for providing a torque about an axis in the plane of said diaphragm for angularly displacing said mount about said axis.

* * * * *